March 1, 1966 — J. K. MOSHER — 3,237,639
CONTROL VALVE WITH PRECHECK SYSTEM
Filed Aug. 28, 1959
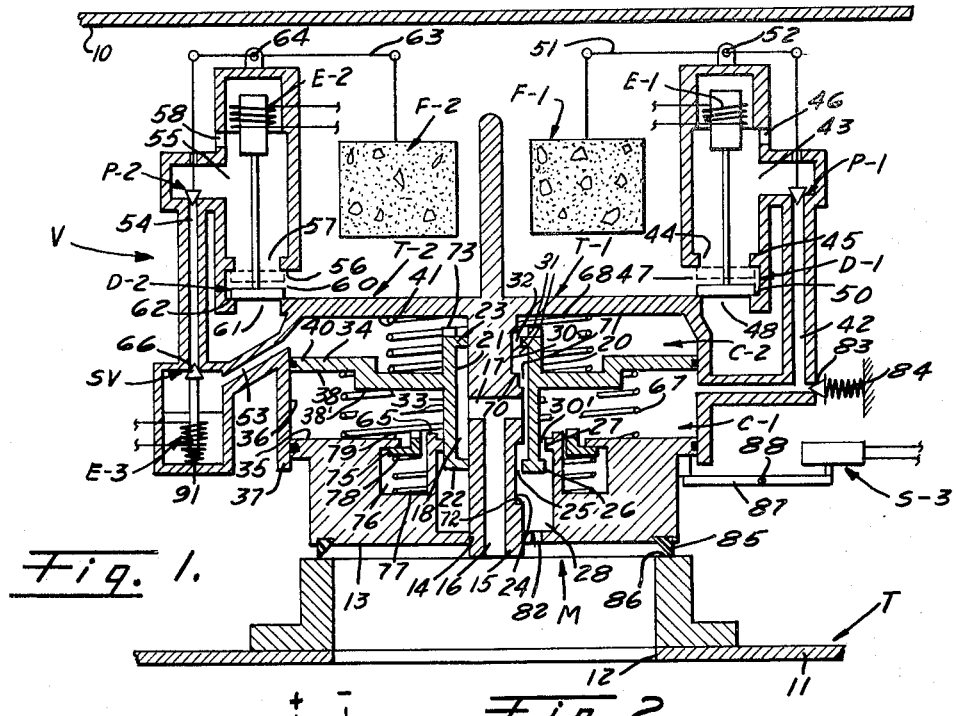
Fig. 1.
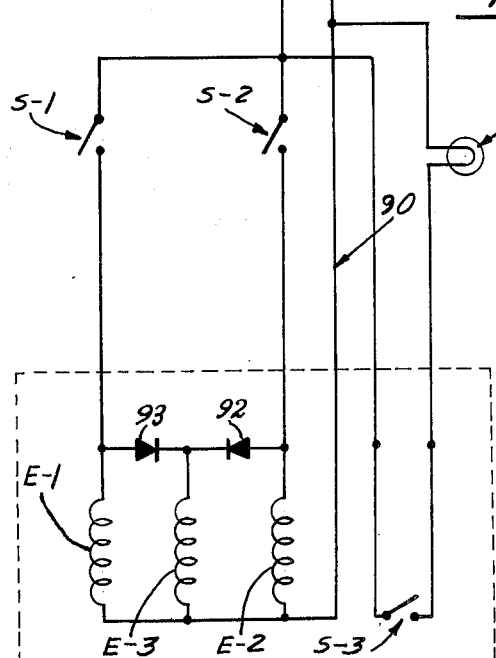
Fig. 2.
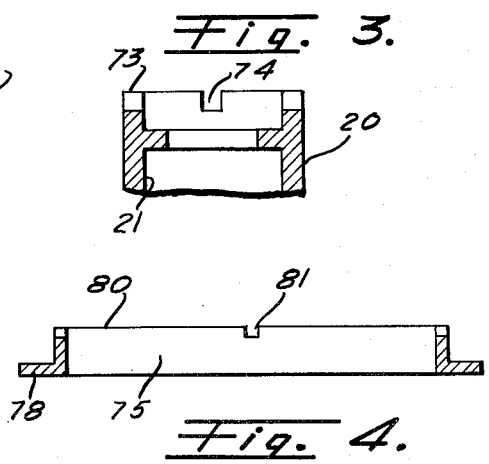
Fig. 3.
Fig. 4.
JAMES K. MOSHER,
INVENTOR.
WHANN & McMANIGAL
Attorneys for Applicant United States Patent Office 3,237,639
Patented Mar. 1, 1966

3,237,639
CONTROL VALVE WITH PRECHECK SYSTEM
James K. Mosher, Pasadena, Calif., assignor to Schulz Tool and Manufacturing Co., San Gabriel, Calif., a corporation of California
Filed Aug. 28, 1959, Ser. No. 836,797
12 Claims. (Cl. 137—390)

This invention relates, in general, to liquid level control valves for use in filling aircraft tanks and the like with fuel which open in response to the pressure of the supply fuel to the tank and close automatically in response to the filling of the tank, and, relates in particular, to provisions in such liquid level control valves for prechecking the operative responsiveness of the valves during filling operation to insure that the valves are working and will automatically cut off the supply fuel when the tank is full.

As is well known, an aircraft that is adapted for inflight refueling has a fuel duct or manifold which leads from a nozzle in the nose of the aircraft to a number of separate fuel tanks. This manifold is used not only for the refueling operation but also to convey fuel from different fuel tanks to the engine or engines of the aircraft.

Means in the form of a normally closed valve means is provided for each fuel tank which opens automatically in response to fuel pressure in the manifold to admit fuel into the tank and which closes automatically when the tank is full. It has been found that malfunctioning of this valve means may result in damage to the fuel tank or the dumping of fuel overboard or in the creation of dangerously high pressure surges in the fuel line and this malfunctioning becomes particularly serious when it is considered that fuel is supplied to an aircraft in flight at rates as high as 600 gallons a minute at pressures of 50 p.s.i. or higher.

On the other hand, inadvertent opening of such valve means during flight when the refueling operation is not in process may result in the pumping of fuel into an empty tank instead of pumping fuel to the engine or engines.

The normally closed valve means utilized in such fuel tanks comprises a main fuel valve which opens in response to the pressure of the supply fuel and is provided with two pilot valves—both of which close in response to the rise of the fuel to a predetermined level in the upper zone of the tank. The main valve closes automatically in response to the operation of either of the two pilot valves. Means are provided in the valve means for diverting a portion of the inflowing fuel to either of the two pilot valves and is so constructed and arranged whereby the main fuel valve closes in response to the rise in back pressure in the diverter passage means whenever either of the two pilot valves close.

In such normally closed valves for an aircraft fuel tank, I have provided a means of forming small test bodies of fuel to act upon two pilot valve floats for selectively prechecking their operation and that of the main valve and the two pilot valves during the fueling operation. The test bodies of fuel are created by releasing or diverting a portion of the fuel in or to an upper zone of the tank and by providing two traps that are operative to collect the released fuel in the regions of the actuating floats of the two pilot valves, respectively. I have also provided such normally closed valves with a safety cutoff valve to prevent flow through the main valve between fueling operations and I have further provided a signal means to indicate whether or not the main valve is closed.

Also in such an arrangement I have also provided two independent remote control means for prechecking the operativeness of the valve assembly. One of the two remotely controlled precheck means is effective to operate one of the two traps and at the same time to open or hold open the safety shutoff valve. The other of the two remotely controlled precheck means is effective to operate the other of the two traps and at the same time also to open or hold open the safety shutoff valve.

The two remotely controlled precheck means are preferably two normally open electric circuits, one of which includes electromagnetic means to open one of the two traps together with the electromagnetic means to open or hold open the safety shutoff valve and the other circuit includes electromagnetic means to open the other of the two traps together with a second electromagnetic means to open or hold open the safety shutoff valve.

During the filling of the aircraft fuel tank whenever the main valve is closed, it has been found desirable to prevent surges in the pressure supply duct or manifold which pressure surges are caused by the rapid closing of the valve. I have reduced such pressure surges by the provision of a means in my valve whereby as the valve closes it decelerates reducing the abrupt change in the flow of fuel.

I have also provided in my valve a means of reducing the time lag during the prechecking operation between the time that the remote control means is operated to precheck the valve and the time that the main valve actually closes and also at the time when the rise of fuel in the tank itself closes the main valve. This is important when it is considered that the pilot of the aircraft may have several such valves to precheck and tanks to fill and time lags during the prechecking operation could be a serious delay.

Accordingly, a general object of my invention is a provision of a liquid level control valve for filling of an aircraft tank with fuel with a prechecking system for prechecking the operativeness of the valve during the filling of a fuel tank.

Still another object of my invention is the provision of a liquid level control valve having a means of prechecking the operativeness thereof during the filling operation and which is provided with means for forming small test bodies of fuel to test the operation of the valve prior to the filling of the tank.

Still another object of my invention is the provision of a liquid level control valve having a safety cutoff valve to prevent the flow through the valve between fueling operations and having a signal means to indicate when the main valve is closed.

Still another object of my invention is the provision of a liquid level control valve having two remotely controlled precheck means to test the operativeness of the valve means during the filling operation.

Still another object of my invention is the provision of a liquid level control with a means of preventing surges in the fuel duct or manifold when the valve closes.

Still another object of my invention is the provision of a liquid level control valve means having a means of reducing the time lag between the time it is desired to close the valve during the prechecking operation or during the filling of the tank and the time that the valve actually closes.

Other and additional objects of my invention will be apparent to those skilled in the art from the following description when taken in connection with the accompanying drawings in which:

FIG. 1 is a schematic illustration of a valve constructed in accordance with the teachings of my invention;

FIG. 2 is a schematic illustration of the electrical circuit for the valve means illustrated in FIG. 1;

FIG. 3 is an enlarged detail view of a portion of a fluid passage means for a second chamber in the valve; and FIG. 4 is an enlarged detail view of a portion of a fluid passage means for a first chamber in the valve.

Turning now to FIG. 1, it can be seen that I have illustrated my liquid level control valve V schematically and mounted in the upper zone of a fuel tank T having a top wall 10 and a bottom wall 11 with an inlet fuel port 12 in the bottom wall.

The valve assembly V comprises, generally, a main fuel value M; a first pilot valve P1; a second pilot valve P2; a first trap T1 associated with the first pilot valve P1; a second trap T2 associated with the second pilot valve P2; a safety shutoff valve SV; a first remotely controlled precheck means operated by a switch S1; a second remotely controlled precheck means operated by switch S2; and a signal lamp L operated by switch S3 indicates when the main value M is closed.

The valve assembly V is also provided with a primary control chamber C1 and a secondary control chamber C2 which are filled with fuel diverted from the main inlet flow through the inlet 12, as will be described.

The trap T1 is provided with a dump valve D1 and the second trap T2 is also provided with a dump valve D2 each of which serves to trap fluid released or diverted past the pilot valves P1 and P2, respectively, to create a liquid level to raise the floats F1 or F2 operatively connected to the pilot valves P1 and P2, respectively, to close the pilot valves P1 or P2 prior to the liquid in the tank reaching a predetermined level to precheck the operativeness of the main valve M, as will be apparent from a further detailed description hereinafter.

The dump valves D1 and D2 are provided with electromagnetic means or solenoids E1 and E2 to operate the traps T1 and T2 to accumulate or release the diverted fuel from the pilot valves P1 and P2, respectively. Safety cutoff valve SV is also provided with an electromagnetic means or solenoid E3 to operate the safety cutoff valve SV and all three solenoids E1, E2 and E3 are connected in an electrical circuit to the switches S1 and S2 and form part of the remotely controlled precheck means.

As can be seen in FIG. 1, the main valve M comprises a piston 13 centrally apertured at 14 to slide vertically on a metering pin 15 having a centrally located vertical diverter passage means 16 which branches at 17 to divert fuel into a metering chamber 18. Thus, a portion of the fuel entering the tank will be diverted or branched to fill the chamber 18 and thence directed into the first control chamber C1 and the second control chamber C2.

The metering chamber 18 is defined by the centrally located metering pin 15 and a cylinder 20 having an inner wall 21 spaced from the pin and radially inwardly extending flanges 22 and 23 at each end of the chamber. The metering pin, being substantially cylindrical, is provided with a flat surface 24 below the conduit 17 to define a metering orifice 25 with flange 22. The cylinder 20 is also provided with a radially outwardly extending flange 26 which, with a radially inwardly extending flange 27 at the top of a chamber 28 in the piston 13, forms a second metering orifice 30' to the control chamber C1. Above the branch conduit 17, the metering pin 15 is also provided with a flat surface 31 to define a metering orifice 32 with flange 23.

Regularly outwardly extending, that is, horizontally as shown in the drawing, from the outer surface 33 of the cylinder 20, is a second piston 34. Second piston 34 is integrally formed with the cylinder 20 to move the latter to change the size of the orifices 25, 30' and 32, for purposes later to be described.

Thus, it is apparent that control chamber C1 is defined by the upper or motive surface 35 of the piston 13, the wall 36 of the main body 37 of the valve, the lower walls 38 and 38' of the piston 34 and the outer wall 33 of the cylinder 20. Secondary control chamber C2 is defined by the wall 36, the upper or motive surface 40 and the lower surface or end wall 41, which separates chamber C2 from traps T1 and T2, the metering pin 15 and the cylinder 20.

Fuel in the chamber C1 is communicated to the pilot valve P1 through diverter passage means 42 in open communication therewith and when the pilot valve P1 is open fuel flows into a chamber 43. As can be appreciated, diverter passage means 42 is therefore operatively connected to diverter passage means 16 and can be said to form an operative part thereof.

Chamber 43 is open at its bottom at 44 and provided with a radially inwardly extending flange 45 which forms a valve seat for one position of the dump valve D1, as shown in dotted lines. When the dump valve D1 is in its upwards position against the valve seat, the chamber 43 fills with fuel which spills out into, or is released in this region of, the upper zone of the tank T through the bore 46. In this position of the dump valve D1 trap T1 is in open communication with the upper zone of the tank T through opening 47 and 48 so that float F1 will be responsive to, or lifted by, the fuel in the tank T when the liquid content of the tank reaches the upper zone.

When the valve D1 is in its lower position and resting against its lower valve seat 50 closing off the opening 48, the fuel in the chamber 43 flows into the trap T1 and continued flow of the released fuel past pilot valve P1 continues to flow into the trap T1 and raise the float F1 by reason of the fact that the dumping valve has now closed off opening 48. Float F1 is operatively connected to the pilot valve P1 by being pivotally connected to lever 51 pivoted at 52 so that raising of F1 closes P1 (also pivotally connected to lever 51) which, in turn, creates a back pressure in diverter passage means 42 and contact chamber C1. With the increase in pressure in control chamber C1 to equal, or almost equal, the supply pressure, the piston M of the main valve M is urged closed against the pressure of the supply fuel—cutting off the flow of fuel into tank T.

It should be noted here that the fuel in the chamber 43 which spills into the trap T1 serves to partially fill the trap T1 so that the time lag between the closing of the opening 48 and the closing of the pilot valve P1 during the prechecking operation is considerably reduced; thus, reducing the time necessary to precheck the pilot valve P1. This is important when it is considered that a pilot may have several such tanks and liquid level control means to precheck during flight, and thus time is very important. This forms an important feature of my invention as hereinabove mentioned.

In like manner, fuel is communicated to pilot valve P2 through diverter passage means 53, past safety cutoff valve SV, when open, through diverter passage means 54 into chamber 55. Diverter passage means 54 operatively forms a continuation of diverter passage means 53 and both can be said to form an operative part of diverter passage means 16. In a manner similar to that described in connection with dump valve D1 when valve D2 is in its upper position seating against valve seat 56, as shown in dotted lines, closing off the opening 57, fuel in the chamber 55 will accumulate and spill out through bore 58 into, or be released in this region of, the upper zone of the tank T. In this position of the dump valve D2 trap T2 is in open communication with the upper zone of the tank T through opening 60 and 61 to be likewise responsive to the level of pressure in the upper zone of the tank.

When the dump valve D2 is lowered from its raised position against its valve seat 62, the accumulated fuel in the chamber 55 will spill into the trap T2 and continued flow of fuel released by the pilot valve P2 will cause the float F2 to rise. Float F2 is operatively connected to the pilot valve by being pivotally connected to lever 63 fulcrumed at 64 so that rising of the float F2 (also pivotally connected to lever 63) will close the pilot valve P2. As mentioned in connection with the chamber 43, chamber 55 by reason of its spilling of the accumulated fuel therein into the trap T2, serves to reduce the time lag between the lowering of the dump valve D2 and the closing of the pilot valve P2 to reduce the prechecking time which is an important feature of my invention for the reasons set forth above.

Also in connection with the closing of pilot valve P2, a back pressure is created in diverter passage means 53 and 54, as well as in control chamber C2. The creation of this back pressure in chamber C2 causes the second piston 34 to move downwardly against the pressure in the chamber C1 and ultimately causes the lower wall 38 to contact the top edge 65 of the piston 13 urging the piston closed against the pressure supply fuel cutting off the flow of fuel into the tank T.

It is also apparent from the description thus far that when the safety valve SV is closed against its seat 66, its normal position, a back pressure will be created in the diverter passage means 53 and the chamber C2 to close the piston of the main valve M in like manner.

It can be seen in FIG. 1 that there is also provided a helical compression spring 67 which engages the motive surface 35 of the piston 13 and the lower side 38 of the second piston 34. There is also provided a second compression spring 68 which engages the motive surface 40 of the second piston 34 and the wall 41 of the main body. Compression spring 67, being stronger than the compression spring 68, tends to urge the piston 34 upwardly and overcome the spring 68 and at the same time urge the main piston 13 downwardly to close the main valve M. Thus, when there is no inlet supply pressure tending to urge the main valve open, the main valve will be closed by the action of the springs. When a pressure is created in control chamber C1, the spring 67 serves to aid this back pressure in overcoming the inlet supply pressure of fuel to close the main valve. Likewise, when a back pressure is created in control chamber C2, the spring 68 aids in overcoming the pressure of the spring 67 and the inlet supply pressure to close the main valve M.

As previously mentioned, it is highly desirable to reduce the surge of pressure in the manifold or the supply of fuel caused by the rapid closing of the valve M and this accomplishment forms another important feature of my invention as heretofore mentioned. This means of reducing the surges in the supply pressure will now be described.

When the pilot valve P1 is open and the diverted fuel enters the chamber C1, it flows past the metering orifices 25 and 30. With the closing of the pilot valve P1 and the creation of the back pressure in the control chamber C1, the piston 13 is urged downwardly, as previously described. At this time, the inwardly extending flange 27 on the piston 13 moves closer to the outwardly extending flange 26 on the cylinder 20 reducing the size of the orifice 30'. As the piston 13 closes, simultaneously the orifice 30' closes so that the flow of fuel to the control chamber C1 is substantially reduced. This means of gradually cutting the supply of fuel into the control chamber C1, as can be appreciated, causes a gradual decrease in the velocity of the piston 13 toward its closing position to prevent an abrupt closing of the piston.

Also in connection with the control chamber C2 fuel diverted from the main flow of fuel flows past orifice 32 and then into the control chamber C2. When the pilot valve P2 is closed a back pressure is created in the control chamber C2 urging the piston 34 downwardly. This urging of the piston 34 downwardly overcomes the spring 67 and will ultimately cause the surface 38' to engage the top surface 65, as previously mentioned. This causes movement of the main piston 13 toward its closing position. However, concurrently with the movement of the piston 34 downwardly, the inwardly extending flange 23 on the cylinder 20 moves toward a shoulder 70 on the metering pin 15 below the flat portion 31, previously mentioned, which creates a second metering orifice 71 between the flange 23 and the shoulder 70 gradually reducing the flow of diverted fuel into the control chamber C2. As the piston 34 moves toward its final position, the orifice 71 is gradually closed and the flange 23 moves over the shoulder reducing the flow of fuel substantially. As can be appreciated, when the supply of motive pressure is gradually reduced, the movement of the piston 13 is also reduced gradually until the flow of fuel into the tank T is cut off, reducing the tendency of surges in the supply of fuel otherwise caused by a rapid closure of the main valve.

As can be appreciated, the above conditions described in the gradual closing of the main valve through the closing of either of the pilot valves can be affected by the prechecking operation. However, when the supply of fuel reaches the upper zone in the tank T to raise the floats F1 and F2 by entering through openings 47, 48, and 60, 61, respectively, to close both the pilot valves P1 and P2, it is possible that back pressures will be created in both control chambers C1 and C2 which act in combination to urge the main valve closed. In this case, because of the movable characteristic of the orifices connected to the secondary piston 34, provision is made so that the change of position of the piston 13 with respect to the piston 34 will not decrease the ability of the valve assembly to reduce surges in the supply line.

With the piston 34 moving downwardly, the supply of fuel is, of course, gradually reduced in the chamber C2 by the closing of the orifice 71, as previously mentioned since the piston 34 is movable with respect to the metering pin 15. With the slowing down of the piston 34 and the closing of the orifice 71, the orifice 32 will reduce the flow into chamber C2 slowing the closing of the main valve. On the other hand, it is possible that the piston 34 may move faster than the piston 13 in which case orifice 25 may never become smaller. In the latter case, inwardly extending flange 22 moves closer to shoulder 72 at the bottom of flat 24 on the pin 15 so that flow is restricted into chamber C2 decelerating piston 13.

When the valve is in its fully opened position, the pressure acting upon piston 13 may be such to urge the top edge 65 against the bottom side 38 of the piston 34 and at the same time the top end 73 of the cylinder 20 may engage the bottom surface 41 of the body 37. In order to prevent a restriction of the flow of fuel into the chambers C1 or C2, I have made additional provisions.

Turning now to FIG. 3, where the cylinder 20 is shown in an enlarged detail, it can be seen that a plurality of slots 74 are provided in the top end of the cylinder 20 to provide for unrestricted flow into the chamber C2. In this manner when the pilot valve P2 or the safety valve SV is closed there will be no time delay for the build-up of back pressure in the chamber C2 to close the valve M as soon as possible.

In the main piston 13 there is also provided a ring member 75, right angular in cross section, as more clearly shown in FIG. 4, disposed in a torus cavity 76 formed in piston 13, spring-biased by a spring 77 upward so that one flange 78 is against an inwardly extending flange 79 in a manner shown in FIG. 1. This ring 75 is also provided on its top periphery 80 with a plurality of slots 81 which, when the top 80 engages the surface 38 of the piston 34, flow into chamber C1 will not be restricted in any manner. Spring 77 is sufficiently weak, however, to be overcome by the piston 34 as it is urged downwardly in response to the back pressure in chamber C2 so that it will be depressed and the underside 38 will engage the top 65 to urge the main valve closed. Engagement of the lower surface of the piston 34 with the top edge 65 of the piston 13 substantially closes the passage 30' which closes the fluid supply to the chamber C1 and stops the flow through the passage 42. This ring serves, however, to prevent a time lag between the closing of the pilot valve P1 and the closing of the main valve M during precheck or upon failure of the pilot valve.

For additional flow into the chamber C1 there has also been provided another diverter passage means 82 which is in communication with the chamber 28 and will allow fuel from the supply to be metered past the metering orifice 30' into the chamber C1. Also, as a safety feature to prevent surges in the event that the pressure in the chamber C1 is building up faster than can be slowed down by the orifices, as above described, an additional valve 83 in open communication with the passage C1 is provided. Spring 84, urging the valve against its seat, is preselected according to the desired maximum pressure in the chamber C1.

In the operation of my valve, if there is no pressure in the supply line tending to urge the piston open, the main piston 13 is maintained closed by the two springs 67 and 68 so that the sealing ring 85 carried by the piston 13 rests on the valve seat 86 to prevent the flow of liquid into tank T. In this position if, for some reason, either of the pilot valves, and/or if the safety valve were closed, an increase in pressure in the supply of fuel would not open the valve M by reason of the fact that pressure build-up in chambers C1 and C2 create a differential of force by reason of the size of the areas of the motive surfaces 35 and 40 of the pistons 13 and 34, respectively, tending to maintain the valve closed. Thus, inadvertent filling of the tank T is prevented.

At this time, too, switch S3 would be closed by reason of the fact that the lever arm 87, which is pivoted at 88 and moved by the piston 13, would urge the switch S3 closed to indicate by the lighting of the lamp L that the main valve closed.

Between the filling operations, the switches S1 and S2 are normally open so that all the solenoids are deenergized and the valve M is held closed by the springs 67 and 68, as aforesaid.

During the filling operation, remotely located switches S1 and S2 are both closed which energizes solenoids E1, E2 and E3, all electrically connected by wiring, indicated in its entirety as 90, to form a circuit with switches S1 and S2.

With the energization of solenoids E1 and E2, the pilot valves P1 and P2, if closed by reason of fuel being trapped in traps T1 and T2 will be opened by raising of the dump valves D1 and D2, allowing the flow of fuel from the traps into the tank T. The energization of E3 also opens safety cutoff valve SV against the biasing spring 91, normally holding the valve closed, so that the pressure acting upon the main piston M will open the main valve M and allow the fuel to flow into the tank T both past the main valve and also past the pilot valves into the two regions adjacent the openings 46 and 58 in the upper zone in the tank. At this time, switch S3 is opened, extinguishing the indicator light L.

Switches S1 and S2 all form part of a remotely controlled prechecking means now to be described.

For the prechecking of pilot valve P1, switch S1 is opened (switch S2 remaining closed) causing a deenergization of the solenoid E1, lowering D1, which closes off the opening 48 and drains the fuel in the chamber 43 into the trap T1. Pilot valve P1 will remain open until the fuel in the trap T1 is sufficient to raise the float F1 and close the pilot valve P1 at which time the back pressure created in the diverter passage means 42 and the chamber C1 will close the main valve, stopping the flow of fuel into the tank T. The closing of the main valve again closes the switch S3 to light the indicator light L. During this operation, solenoids E2 and E3 remain energized by reason of their arrangement in the first electrical circuit with the source of power and the diode 92. Safety valve SV is thus maintained open.

Closing of the switch S1 will again energize the solenoid E1 so that the main valve M will again open by releasing the fuel in the trap T1, allowing the switch S3 to open and the flow of fuel to enter the tank T.

For the next precheck operation switch S2 is open (switch S1 remaining closed) which deenergizes the solenoid E2 but maintains the solenoids E1 and E3 energized by the arrangement of the second circuit including the diode 93 of the circuit, as illustrated in FIG. 2. The deenergization of solenoid E2 allows the dump valve D2 to lower, closing off the opening 61 and draining the fuel in the chamber 55 into the trap T2. Pilot valve P2 will remain open to allow the flow of fuel to continue until the float F2 is sufficiently high to close the pilot valve P2 creating a back pressure in the passage means 54 and 53, as well as in the chamber C2 which will urge the piston 34 into contact with the piston 13 to urge the latter closed again lighting the light L by the closing of switch S3.

Closing of switch S2 will again energize E2, raise the dump valve D2, allow the fuel in the trap T2 to flow into the tank T and allow the main valve to open in response to supply pressure; safety cutoff valve SV remaining open during both precheck operations.

Thus, from the above description, it can be seen that I have provided a new and improved liquid level control valve including, among other things, means for maintaining the main valve piston closed between filling operations when the electrical circuits are normally inoperative by the open remote control switches and which further includes means for creating small test bodies of fuel in the upper regions of the tank to test the operativeness of the valve by diverting portions of fuel from the main flow through the main valve by opening one or the other of the remote control switches to close the main valve. These remote switches operate effectively as two independent circuits to create the aforesaid test bodies during the prechecking operation. Means are also provided for preventing pressure surges in the fuel duct or manifold during the closing of the main valve and means are also provided to prevent the time lag when it is desired to close the main valve, either by the filling of the tank or during the prechecking operation.

While I have referred to aircraft and aircraft fuel tanks, my invention is equally applicable in various fields and it is to be understood that the appended claims should be construed as broadly as the prior art will allow.

I claim:

1. A valve assembly for controlling the flow of liquid from a pressurized supply into a tank, comprising: at least one pilot valve operative to close in response to rise of the liquid content of the tank to a predetermined level at an upper zone in the tank; a normally closed main valve for liquid flow therethrough into the tank to form a main liquid body in the tank, said main valve being responsive to the pressure of the supply liquid to open when said pilot valve is open and being responsive to closing of said pilot valve to close in opposition to the liquid pressure when said predetermined liquid level is reached; means to divert a portion of the inflowing liquid to said upper zone; and remotely controlled means to trap the diverted liquid in said upper zone to create a body of liquid at said predetermined level to close said pilot valve for closing action of the main valve to precheck the operativeness of the valve assembly before the main body of liquid reaches said predetermined level.

2. A valve assembly for controlling the flow of liquid from a pressurized supply into a tank, comprising: a normally closed main valve for liquid flow therethrough to form a main liquid body in said tank; a diverter passage to divert a portion of the inflowing liquid to an upper zone of said tank; at least one pilot valve to close said diverter passage in response to the establishment of a liquid level at said upper zone of the tank thereby to raise the pressure in said diverter passage, said main valve being responsive to the supply pressure to open when the pressure in said diverter passage is relatively low and being responsive to rise in pressure in said diverter passage to close in opposition to the supply pressure whereby the main valve closes automatically in response to closing of said pilot valve when the main body of liquid reaches said level; and remotely controlled means to trap a portion of the diverted liquid to create a body of liquid at said level for prechecking the operativeness of the valve assembly before the main body of liquid reaches said level.

3. A valve assembly as set forth in claim 2 which includes a remotely controlled normally closed safety shut-off valve to close said diverter passage thereby to cause said main valve to close.

4. A valve assembly as set forth in claim 2 which includes signal means to indicate when said main valve is closed.

5. A valve assembly as set forth in claim 2 which includes two pilot valves both of which are connected to said diverter passage to release liquid therefrom; and in which said main valve closes in response to the rise in pressure in said diverter passage that results from the closing of only one of said two pilot valves.

6. A valve assembly for controlling the flow of liquid from a pressurized supply into a tank, comprising: a normally closed main valve for liquid flow therethrough to form a main liquid body in said tank; means to release liquid at an upper zone of said tank; a pilot valve operative to close in response to the establishment of a liquid level at said upper zone, said main valve being responsive to the supply pressure to open when said pilot valve is open and being responsive to closing of the pilot valve to close in opposition to the supply pressure; a trap to collect the released liquid in said upper zone thereby to close said pilot valve and to open to permit the released liquid to flow therethrough; a normally closed safety valve to prevent liquid flow through said main valve; remotely controlled means to open said safety valve to permit the tank to be filled through said main valve; and remotely controlled means to control said trap.

7. A valve assembly for controlling the flow of liquid from a pressurized supply into a tank, comprising: a normally closed main valve for liquid flow therethrough to form a main liquid body in said tank; means including passage means within said main valve to release inflowing liquid at an upper zone of said tank; a first pilot valve and a second pilot valve operative to close in response to the establishment of a liquid level in two respective regions in said upper zone, said main valve being responsive to the pressure of the supply liquid to open when both of said pilot valves are open and being responsive to the two pilot valves individually to close in opposition to the supply pressure when either of the pilot valves is closed; a first means to trap a portion of the released liquid in the region of said first pilot valve to cause closing thereof before the main body of liquid reaches the upper zone of the tank; a second means to trap a portion of the released liquid in the region of said second pilot valve to cause closing thereof before the main liquid body reaches the upper zone of the tank; safety means normally preventing opening of said main valve and being operative to permit the main valve to open; a first remote control means to operate both said first trap means and said safety means and a second remote control means to operate both said second trap means and said safety means; and means within said main valve to reduce the flow through said passage means therein on the closing of one of the pilot valves to prevent back pressure surges in the pressurized supply upon closing of the main valve.

8. A valve assembly for controlling the flow of liquid from a pressurized supply into a tank, comprising: a normally closed main valve for liquid flow therethrough to form a main liquid body in said tank; means including passage means within said main valve to release inflowing liquid at an upper zone of said tank; a first pilot valve and a second pilot valve operative to close in response to the establishment of a liquid level in two respective regions in said upper zone, said main valve being responsive to the pressure of the supply liquid to open when both of said pilot valves are open and being responsive to the two pilot valves individually to close in opposition to the supply pressure when either of the pilot valves is closed; a first means to trap a portion of the released liquid in the region of said first pilot valve to cause closing thereof before the main body of liquid reaches the upper zone of the tank; a second means to trap a portion of the released liquid in the region of said second pilot valve to cause closing thereof before the main liquid body reaches the upper zone of the tank; safety means normally preventing opening of said main valve and being operative to permit the main valve to open; a first remote control means to operate both said first trap means and said safety means and a second remote control means to operate both said second trap means and said safety means; and additional means within the main valve to increase the flow through the passage means when the main valve is fully opened to aid in the closing of the main valve after the closing of one of the pilot valves.

9. A valve assembly for controlling the flow of liquid from a pressurized supply into a tank, comprising: a normally closed main valve for liquid flow therethrough to form a main liquid body in said tank; means including passage means within said main valve to release inflowing liquid at an upper zone of said tank; a first pilot valve and a second pilot valve operative to close in response to the establishment of a liquid level in two respective regions in said upper zone, said main valve being responsive to the pressure of the supply liquid to open when both of said pilot valves are open and being responsive to the two pilot valves individually to close in opposition to the supply pressure when either of the pilot valves is closed; a first means to trap a portion of the released liquid in the region of said first pilot valve to cause closing thereof before the main body of liquid reaches the upper zone of the tank; a second means to trap a portion of the released liquid in the region of said second pilot valve to cause closing thereof before the main liquid body reaches the upper zone of the tank; safety means normally preventing opening of said main valve and being operative to permit the main valve to open; a first remote control means to operate both said first trap means and said safety means and a second remote control means to operate both said second trap means and said safety means; means within said main valve to reduce the flow through said passage means therein on the closing of one of the pilot valves to prevent back pressure surges in the pressurized supply upon closing of the main valve; and additional means within the main valve to increase the flow through the passage means when the main valve is fully opened to aid in the closing of the main valve after the closing of one of the pilot valves.

10. A valve assembly for controlling the flow of liquid from a pressurized supply into a tank, comprising: at least one pilot valve operative to close in response to rise of the liquid content of the tank to a predetermined level at an upper zone in the tank; a normally closed main valve for liquid flow therethrough into the tank to form a main liquid body in the tank; means to permit a portion of the inflowing liquid into the main valve; means to divert inflowing liquid from within the main valve to said upper zone, said main valve being responsive to the pressure of the supply liquid to open when said pilot valve is open; means within said main valve being responsive to closing of said pilot valve to close said main valve in opposition to the liquid pressure when said predetermined liquid level is reached; remotely controlled means to trap the diverted liquid in said upper zone to create a body of liquid at said predetermined level to close said pilot valve for closing action of the main valve to precheck the operativeness of the valve assembly before the main body of liquid reaches said predetermined level; and means within the main valve to reduce the rate of supply of liquid pressure within said main valve on the closing of said pilot valve for preventing back pressure surges in the pressurized supply upon closing of the main valve.

11. A valve assembly for controlling the flow of liquid from a pressurized supply into a tank, comprising: at least one pilot valve operative to close in response to rise of the liquid content of the tank to a predetermined level at an upper zone in the tank; a normally closed main valve for liquid flow therethrough into the tank to form a main liquid body in the tank; means to permit a portion of the inflowing liquid into the main valve; means to divert inflowing liquid from within the main valve to said upper zone, said main valve being responsive to the pressure of the supply liquid to open when said pilot valve is open; means within said main valve being responsive to closing of said pilot valve to close said main valve in opposition to the liquid pressure when said predetermined liquid level is reached; remotely controlled means to trap the diverted liquid in said upper zone to create body of liquid at said predetermined level to close said pilot valve for closing action of the main valve to precheck the operativeness of the valve assembly before the main valve of liquid reaches said predetermined level; and additional means within the main valve to increase the flow within the main valve when it is fully open to aid in the closing of the main valve after the closing of said pilot valve.

12. A valve assembly for controlling the flow of liquid from a pressurized supply into a tank, comprising: at least one pilot valve operative to close in response to rise of the liquid content of the tank to a predetermined level at an upper zone in the tank; a normally closed main valve for liquid flow therethrough into the tank to form a main liquid body in the tank; means to permit a portion of the inflowing liquid into the main valve; means to divert inflowing liquid from within the main valve to said upper zone, said main valve being responsive to the pressure of the supply liquid to open when said pilot valve is open; means within said main valve being responsive to closing of said pilot valve to close said main valve in opposition to the liquid pressure when said predetermined liquid level is reached; remotely controlled means to trap the diverted liquid in said upper zone to create a body of liquid at said predetermined level to close said pilot valve for closing action of the main valve to precheck the operativeness of the valve assembly before the main valve of liquid reaches said predetermined level; means within the main valve to reduce the rate of supply of liquid pressure within said main valve on the closing of said pilot valve for preventing back pressure surges in the pressurized supply upon closing of the main valve; and additional means within the main valve to increase the flow within the main valve when it is fully open to aid in the closing of the main valve after the closing of said pilot valve.

References Cited by the Examiner

UNITED STATES PATENTS

| | | | |
|---|---|---|---|
| 2,851,055 | 9/1958 | Mosher | 251—35 X |
| 2,871,873 | 2/1959 | McQueen | 137—390 |
| 2,910,079 | 10/1959 | Beeghly | 137—115 X |

MARTIN P. SCHWADRON, *Primary Examiner.*

ISADOR WEIL, WILLIAM F. O'DEA, *Examiners.*